INVENTORS
Andreas Geiger
Norbert Eichhorn

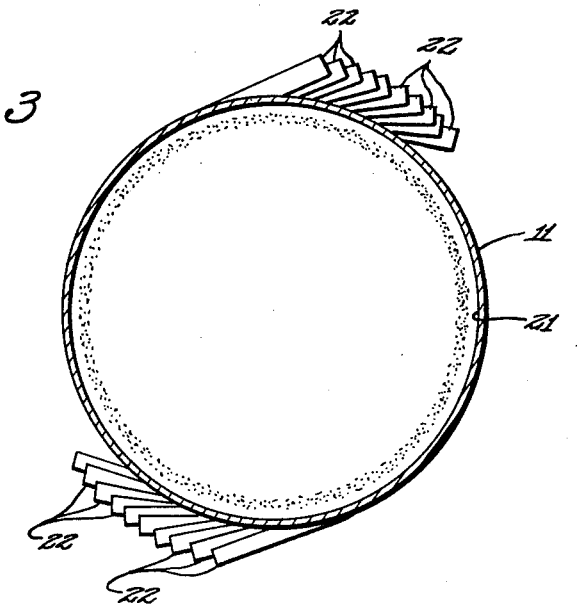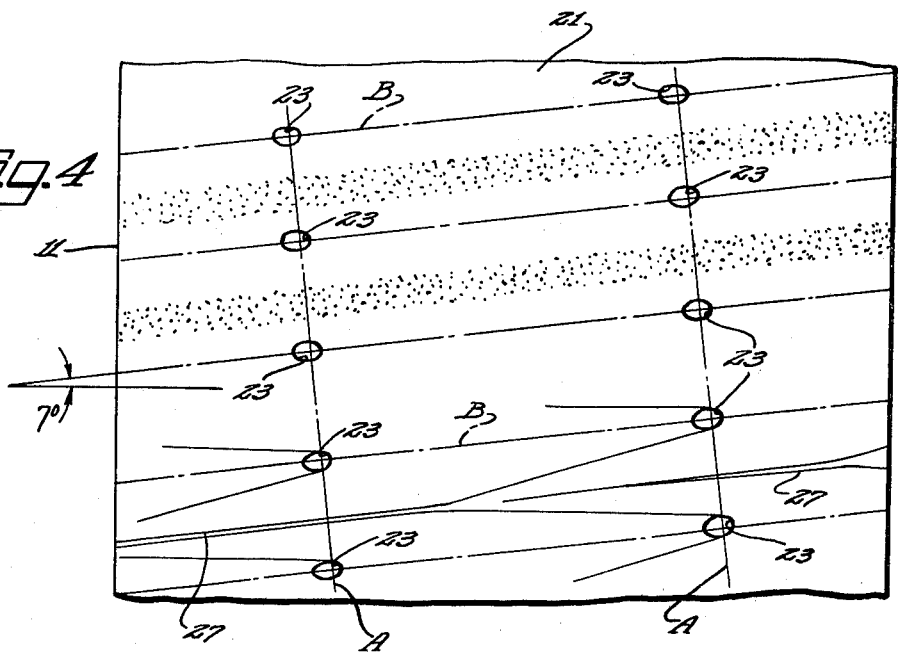

United States Patent Office 3,494,047
Patented Feb. 10, 1970

3,494,047
METHOD AND APPARATUS FOR CARRYING OUT PHYSICAL AND CHEMICAL REACTIONS
Andreas Geiger and Norbert Eichhorn, Bad Hersfeld, Germany, assignors to Schilde Aktiengesellschaft, Bad Hersfeld, Germany, a German corporation
Filed Jan. 22, 1968, Ser. No. 699,737
Claims priority, application Germany, Jan. 25, 1967, Sch 40,135
Int. Cl. F26b 3/08, 17/10
U.S. Cl. 34—10                            8 Claims

ABSTRACT OF THE DISCLOSURE

Apparatus for drying granular products, which may be volatile products, food products and other products. The apparatus may also subject the products to chemical reactions where desired and consists of an elongated tube having a cylindrical internal wall which may be vertically arranged. An inlet for the product enters the apparatus from the top of the tube. An outlet leads from the bottom of the tube and may be closed by a conventional bucket type of valve. The tube has two rows of vertically spaced nozzles leading to the internal cylindrical wall of the tube tangentially of the wall of the tube and spaced 180° apart. Each row of nozzles enters the tube along a line inclined with respect to the longitudinal axis of the tube. The axes of the nozzles are perpendicular to this line and direct fluid under pressure tangentially of the internal cylindrical wall of the tube, to advance along the tube from the upper to the lower end of the tube in a helical path. A fluid enters the tube through the nozzles under pressure, creating helical paths of barriers moving downwardly along the tube from the inlet to the discharge end thereof between adjacent flow paths of the fluid, which carries the solid particles along the tube and forces the particles toward the wall of the tube to form cloud-like structures moving in continuous spirals from the inlet to the outlet end of the tube.

Objects of the invention

A principal object of the present invention is to provide an improved method and apparatus for drying solid particles and for carrying out chemical reactions in the particles, in which the particles are maintained suspended by the fluid acting on the particles in the form of a continuous helix from the inlet to the outlet end of the apparatus.

Another object of the invention is to provide an apparatus for drying products, which may also carry out chemical reactions, in which drying is attained by establishing motion of the products by injecting heated air into the apparatus to suspend the products to move along the apparatus in helical paths of preselected pitches.

A further object of the invention is to improve upon the drying and carrying out of chemical reactions of various materials, in which drying is attained by the helical flow of the materials along a tube induced by fluid jets entering the tube for the length thereof, to maintain a continuous uniform particle suspending helix throughout the length of the tube.

These and other objects of the invention will appear from time to time as the following specification proceeds and with reference to the accompanying drawings wherein:

FIGURE 3 is a horizontal sectional view taken along the top portion of the inner cylindrical tube shown in FIGURE 1 and looking downwardly along the tube; and FIGURE 4 is an orthogonal view in plane projection, showing the pitch of the nozzle and aligned relation of the nozzles with respect to each other and generally illustrating the barrier spaces generated by the jets issuing from the nozzles.

Figures 1, 2:
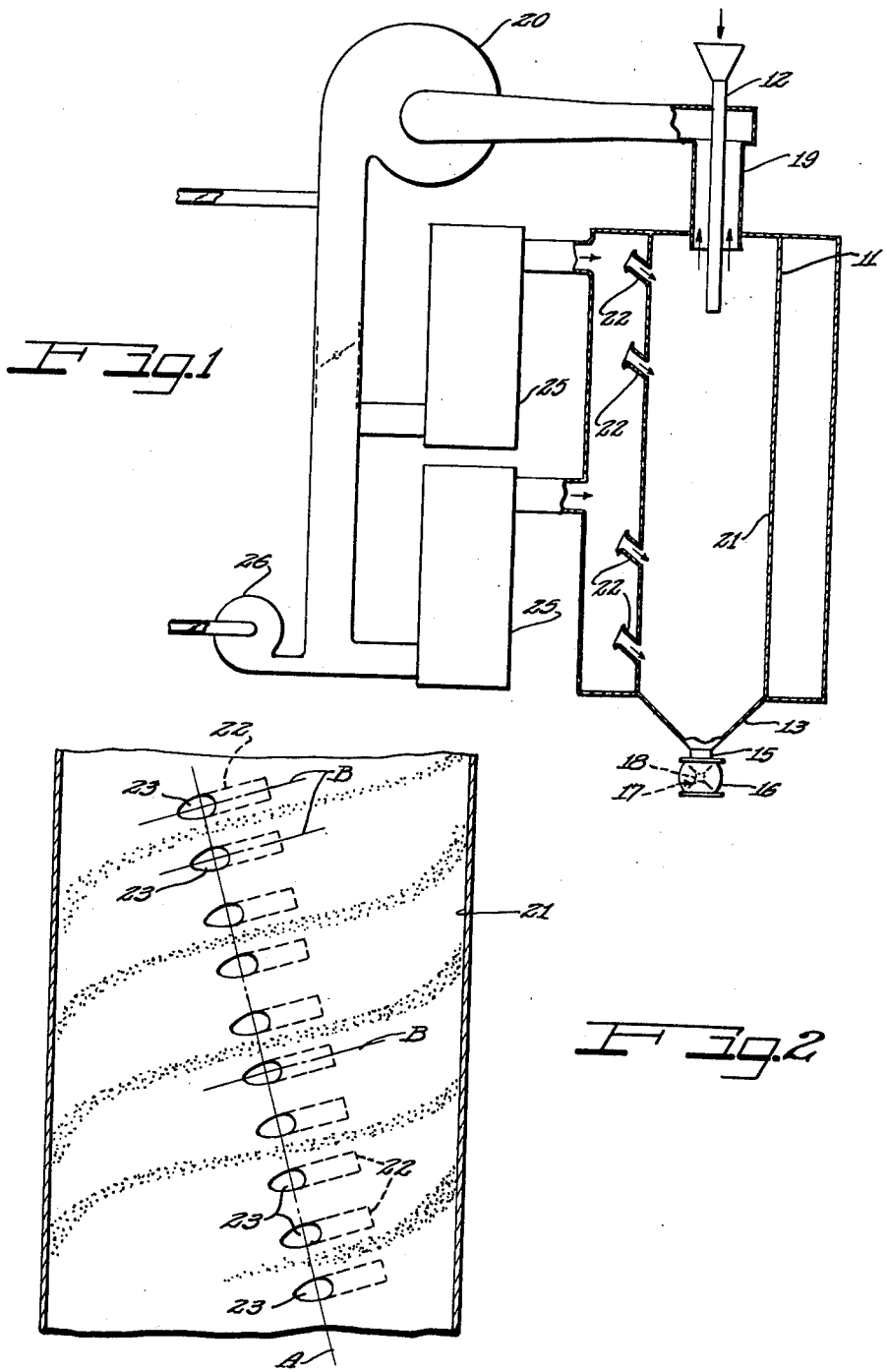
FIGURE 1 is a generally diagrammatic view in side elevation, illustrating an apparatus constructed in accordance with the principles of the present invention.
FIGURE 2 is an enlarged diagrammatic view illustrating the nozzle arrangement of one row of nozzles, and the helical paths of the particles being dried.

In the embodiment of the invention illustrated in the drawings, FIGURE 1 generally shows an apparatus for carrying out physical and/or chemical reactions on solid particles, which is particularly adapted for drying the particles. The apparatus generally includes a cylindrical tube 11 having an inlet 12 for the partices to be dried or otherwise reacted upon, entering the tube from the top thereof, and having a restricted bottom 13, shown as being of a generally frusto-conical form and converging to an outlet 15. A valve 16, diagrammatically shown as being a bucket type valve, is provided to close the outlet 15 and to exclude air from entering the apparatus through said outlet. The valve 16 includes a rotatable valve member 17 having a series of radial buckets or pockets 18. The apparatus also includes an air outlet 19, shown as encircling the inlet 12. The air outlet 19 may be connected with a suction blower 20 (not shown) for withdrawing air along the vortex of the air stream, although the suction blower need not necessarily be used.

The tube 11 may be made from any suitable material and in many instances may be made from a transparent material, to enable the flow of the products being dried or reacted upon, to be viewed during the drying operation. The tube 11 has an interior cylindrical wall 21, into which lead a plurality of nozzles 22, spaced along the wall of the tube from the inlet to the outlet end thereof, and arranged in vertically extending rows along center lines A, inclined relative to the longitudinal axis of the tube and receding from the inlet to the outlet end of the tube. The nozzles 22 have nozzle openings 23 opening through the wall 21 of the tube. The axes of the nozzle openings are along lines B perpendicular to the center lines A, to create a helical flow of air or other drying material along the interior wall of the tube.

As shown in FIGURE 4, two rows of nozzles 22 are provided and these rows are disposed 180° apart, with the nozzle openings 23 of each row facing in the same direction and inclined at the same angle as the nozzle openings of the other row. For larger tube diameters three and four rows may be provided. These rows may be spaced apart 120° and 90° respectively.

The nozzles 22 may be connected to a suitable source of fluid under pressure which may be air heated by suitable heat exchangers 25 through which the air may be forced by the blower 20, or other pressure inducing apparatus. A blower 26 may also be provided to bring fresh air into the system, where desired.

Where chemical reactions are to take place in the apparatus, the fluid may be a suitable gas or may be a liquid, heated or cooled to a desired temperature.

The nozzle openings 23 are arranged to direct air into the interior of the tube 11 along the wall 21 thereof, tangentially of said wall, and are inclined downwardly relatively to the horizontal at a relatively flat angle, shown in FIGURE 3 as being an angle of 7°. The angle, however, may be less than 7° and also may be as great as 20°. The angle of 7°, however, has been found to be a satisfactory means angle for the lower limit of the nozzle. The jets of heated air simultaneously leaving the nozzles of each row of nozzles form helical dams or barriers for the entire length of the interior wall of the tube and collecting the solid particles entering the tube through the inlet 12, to be forced outwardly along the wall of the tube by the centrifugal force of the jets, and to advance along the barriers formed by the jet streams from the inlet to the outlet of the tube in a continuous controlled path, in accordance with the pitch of the nozzles and the pressure of fluid entering the tube through the nozzles.

FIGURE 4 shows an orthogonal network in plane projection and shows the nozzle openings 23 opening into the interior wall of the tube and directing jets of fluid along helical lines perpendicular to the lines A and inclined with respect to the horizontal. This figure also shows that the axes of the corresponding jets of each row of jets are on the line B perpendicular to the line A and forming in effect a double thread helix. The fluid injected into the tube thus expands in pairs, and expansion of the fluid as it leaves each nozzle of one row of jets is exactly the same as expansion of the fluid in the diametrically opposed row of jets, and thereby forms a double pitch helix with a continuous fluid barrier space 27 between the adjacent vertically spaced fluid jets passing downwardly along the tube in a controlled helical path and thereby determining the course and position of the path of the solid particles.

It may be seen from the foregoing that a simple form of method and apparatus has been provided for drying or cooling solid particles in a predetermined time limit determined by the course of the helical path of the particles, governed by the helical jets passing along the interior wall of the drying tube.

It may further be seen that the apparatus and process of the invention in addition to being adapted to drying or cooling solid particles or other materials, may readily be used for calcining or subjecting the particles to chemical reactions.

While one form of the invention has herein been shown and described, it should be understood that various modifications and variations in the invention may be attained without departing from the spirit and scope of the novel concepts thereof.

We claim as our invention:

1. In an apparatus for carrying out physical and chemical reactions,
    a tube having a cylindrical interior wall,
    an inlet for solid particles leading into said tube adjacent one end thereof,
    an outlet for treated particles leading from the opposite end of said tube, and
    means forming a traveling continuous helical barrier space for treatment of the solid particles within said tube, conveying the solid particles along the wall of said tube in a controlled helical path for the length of said tube by the centrifugal force of the jets comprising,
        a row of fluid nozzles directed into said tube through said cylindrical wall generally tangentially of said interior cylindrical wall at a uniform pitch and forming a helical barrier zone suspending the solid particles in said tube and advancing the solid particles from the inlet to the outlet end of said tube in a continuous operation.

2. An apparatus in accordance with claim 1,
wherein the nozzles are spaced along a common line extending along the wall of said tube and inclined with respect to the axis of said tube, and positioning the nozzles at the inlet end of said tube in advance of the nozzles at the discharge end of said tube.

3. An apparatus in accordance with claim 2,
wherein the nozzles have nozzle openings inclined to direct jets of fluid into said tube, tangentially of the wall of said tube, and perpendicular to the common line extending along the cylindrical wall of said tube.

4. An apparatus in accordance with claim 3,
wherein the nozzle openings are inclined with respect to the wall of said tube at angles in the range of between 7° and 20° with respect to the horizontal, to direct the jets to pass helically along said tube from the inlet to the outlet end thereof.

5. The apparatus of claim 2,
wherein at least two rows of cooperating nozzles enter said tube through the wall thereof at the same angles and spacing from the bottom of said tube.

6. An apparatus in accordance with claim 4,
wherein at least two rows of cooperating nozzles enter said tube through the wall thereof at the same angles and spacing from the bottom of said tube, and
wherein the corresponding nozzles of each row of nozzles are on the same line perpendicular to the common line extending along the cylindrical wall of said tube.

7. A method of carrying out physical reactions comprising the steps of:
    creating a series of symmetrical helical fluid flow paths along an internal cylindrical surface, moving from one end of the surface to the other and forming a continuous fluid barrier zone between the flow paths, by injecting fluid jets under pressure along the internal cylindrical surface tangentially thereof and inclined downwardly with respect to a diametrical line extending across the cylindrical surface and then admitting solid particles into the internal cylindrical surface along the top thereof, and carrying the solid particles along the cylindrical surface from one end thereof to the other by the centrifugal forces created along the barrier zones.

8. The method of claim 7,
wherein the jets of fluid and solid particles are retained from passing beyond the cylindrical surface and the jets of fluid are returned along their vortex along the inlet end of the cylindrical surface, while the solid particles are collected at the opposite end of the cylindrical surface and discharged for further operations thereon.

References Cited

UNITED STATES PATENTS 2,240,854   5/1941   Peebles.
2,634,116   4/1953   Witt.

FREDERICK L. MATTESON, Jr., Primary Examiner

R. A. DUA, Assistant Examiner

U.S. Cl. X.R.

34—57